(12) United States Patent
Åsbogård et al.

(10) Patent No.: US 9,651,140 B2
(45) Date of Patent: May 16, 2017

(54) ARRANGEMENT AND METHOD FOR ESTIMATING THE INPUT TORQUE OF A DUAL-CLUTCH TRANSMISSION

(71) Applicant: VOLVO TRUCK CORPORATION, Göteborg (SE)

(72) Inventors: Mattias Åsbogård, Mölnlycke (SE); Krister Fredriksson, Kyrkesund (SE)

(73) Assignee: Volvo Lastvagnar AB, Göteborg (SE)

( * ) Notice: Subject to any disclaimer, the term of this patent is extended or adjusted under 35 U.S.C. 154(b) by 73 days.

(21) Appl. No.: 14/650,310

(22) PCT Filed: Dec. 7, 2012

(86) PCT No.: PCT/EP2012/005055
§ 371 (c)(1),
(2) Date: Jun. 7, 2015

(87) PCT Pub. No.: WO2014/086382
PCT Pub. Date: Jun. 12, 2014

(65) Prior Publication Data
US 2015/0308565 A1 Oct. 29, 2015

(51) Int. Cl.
*F16H 59/14* (2006.01)
*F16H 59/16* (2006.01)
*F16H 61/688* (2006.01)

(52) U.S. Cl.
CPC ............ *F16H 59/14* (2013.01); *F16H 59/16* (2013.01); *F16H 61/688* (2013.01); *F16H 2059/147* (2013.01)

(58) Field of Classification Search
None
See application file for complete search history.

(56) References Cited

U.S. PATENT DOCUMENTS

| | | | |
|---|---|---|---|
| 8,775,044 B2 * | 7/2014 | Teslak | F16H 59/16 701/67 |
| 2007/0199397 A1 * | 8/2007 | Maten | F16H 61/688 74/340 |

OTHER PUBLICATIONS

International Search Report (Mar. 20, 2013) for corresponding International App. PCT/EP2012/005055.
International Preliminary Report on Patentability (Mar. 13, 2015) for corresponding International App. PCT/EP2012/005055.

* cited by examiner

*Primary Examiner* — Ramya Burgess
*Assistant Examiner* — Timothy M Hannon
(74) *Attorney, Agent, or Firm* — WRB-IP LLP

(57) ABSTRACT

An arrangement for estimating the input torque of a dual-clutch transmission for a vehicle is provided. The transmission includes an inner input shaft and an outer input shaft arranged concentrically with respect to the inner input shaft. The arrangement further includes a dual-clutch assembly connecting the shafts to an output shaft of an engine. A torque sensor is arranged on the outer input shaft and connected to a transmission control unit. By torque sensor, a measured torque value is provided during operation of the outer input shaft and for providing an estimated torque value during operation of the inner input shaft.

15 Claims, 1 Drawing Sheet

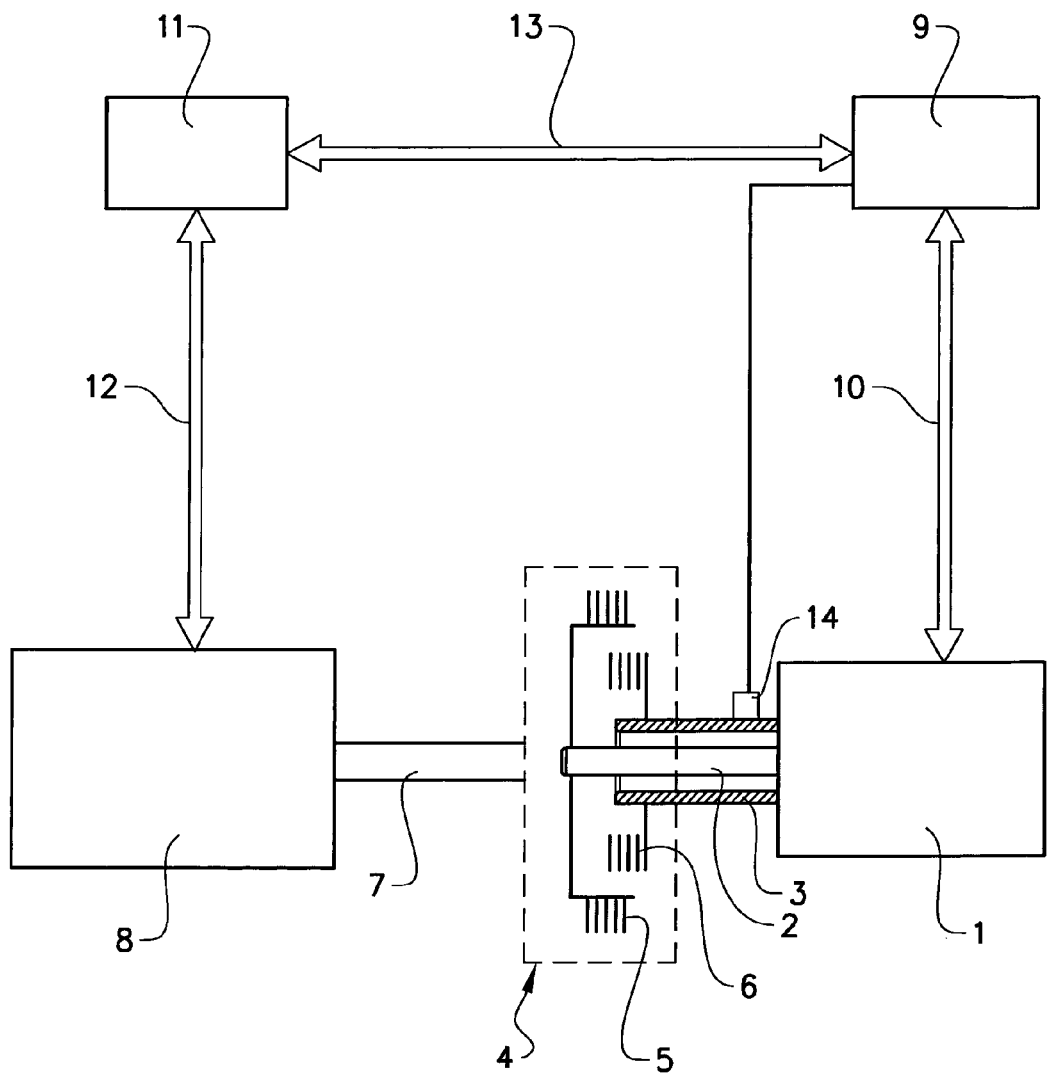

ARRANGEMENT AND METHOD FOR ESTIMATING THE INPUT TORQUE OF A DUAL-CLUTCH TRANSMISSION

BACKGROUND AND SUMMARY

The present invention relates to an arrangement and a corresponding method and computer system for estimating the input torque of a dual-clutch transmission for a vehicle, said transmission comprising an inner input shaft and an outer input shaft being arranged concentrically with respect to said inner input shaft, said arrangement further comprising a dual-clutch assembly connecting said shafts to an output shaft of an engine.

In the field of heavy transport vehicles, it is known that such a vehicle can be provided with a transmission unit of the kind which is provided with a dual clutch. According to known technology, a dual-clutch transmission is based on the principle that two single-plate or multi-plate clutches are used for operating a number of gears. For example, the two clutches can be arranged concentrically, in a manner so that an outer clutch drives the odd-numbered gears whereas an inner clutch drives the even-numbered gears of the transmission.

Shifting between gears in the dual-clutch transmission can be accomplished by applying torque from the vehicles engine to one of the two clutches while the torque is being disconnected from the other clutch. In this manner, shifting between gears can be carried out generally without interrupting, the torque being transferred to the driven road wheels. Also, shifting can be carried out more quickly than in transmissions of the single-clutch type.

As previously known, a dual-clutch transmission can be arranged with two input shafts, each one being connected to a friction clutch and also to the output of the vehicle engine. Functionally, this is equivalent to having two conventional transmissions in parallel, that is two parallel sub-transmissions, and using one at a time for power transfer. Suitably, the two input shafts are arranged in a concentrical manner, i.e. so that a first input shaft constitutes an inner input shaft which extends inside an outer input shaft.

The sub-transmission that is not used, thus idling for the time being, can have a gear engaged and prepared for a subsequent shift. This shift is carried out by simultaneously disengaging the friction clutch of the previously used sub-transmission and engaging the friction clutch of the previously idling sub-transmission.

In order to operate a dual-clutch transmission in an optimal manner, there is a need for control of the transmission by means of a computerized transmission control unit. Such a unit uses signals from a number of sensors, and also input from an engine control unit, in order to determine the timing of changing gears and other parameters which affect the shilling operation. This process is optimized in order to obtain, for example, a high level of performance, fuel economy and vehicle handling.

In order to optimize the gear-changing process in a dual-clutch transmission, an input signal indicating the input torque acting upon the two input shafts is required. A conventional torque sensor is a component which is costly and which is also a relatively large component which is difficult to fit within a transmission unit. For this reason, an alternative solution is to estimate the torque—i.e. instead of actually measuring the torque—based on certain parameters such as the amount of fuel injected to the vehicle engine, the engine speed, the temperature and other parameters. This gives an estimate of the input torque which is sufficiently accurate in order to operate transmission in a suitable manner.

A signal representing a directly sensed input torque acting upon the transmission enables a number of functions to be implemented, such as for example a feedback control of the transmitted torque in the clutch of the transmission; a clutch diagnosis; engine diagnosis; and improved robustness of transmission control (with regard to gear shifting, gear selection etc).

In summary, in a dual-clutch transmission for vehicles, two concentrically arranged input shafts are utilized. In order to control the transmission in an optimal manner, a signal representing the input torque acting upon each of the input shafts can be provided by means of a torque sensor. Alternatively, an estimate of the torque can be determined based upon certain parameters.

Implementing a torque sensor on a traditional single input-shaft transmission is straightforward. However, for a transmission with dual concentric input shafts it is very difficult to measure the torque on the inner input shaft. This is mainly clue to the difficulty of mounting the sensor on the inner input shaft, i.e. inside the outer input shaft. Currently available solutions will be too expensive or will have poor accuracy.

EP2272729 discloses an example of prior art comprising a dual-clutch transmission with a torque sensor 22 arranged on one of the two input shafts of the dual-clutch transmission.

DE102008026509 discloses a method for how to via a measurement determine or estimate a torque of a shaft in a transmission without using a torque sensor.

It is previously known to use an estimated torque as described above. However, such a known method does not have the required resolution of accuracy for many of the desired functions, e.g. engine diagnosis. Consequently, a problem which exists with regard to previously known solutions is that known principles for estimating the torque are not sufficiently accurate. Also, it is not possible to use arrangement involving two separate sensors, i.e. one sensor on each inner shaft.

A problem with prior art is consequently that it does not offer any solution of providing an accurate sensor-based measurement of the torque acting upon the two input shafts of a dual-clutch transmission for a heavy transport vehicle.

Consequently, it is desirable to solve the above-mentioned problem and to provide an arrangement and method for estimating the input torque of a dual-clutch transmission in which accurate values of the input torque acting upon the input shafts of a dual-clutch transmission can be obtained in a reliable and cost-effective manner.

In accordance with an aspect of the invention, an arrangement for estimating the input torque of a dual-clutch transmission for a vehicle is provided, said transmission comprising an inner input shaft and an outer input shaft being arranged concentrically with respect to said inner input shaft, said arrangement further comprising a dual-clutch assembly connecting said shafts to an output shaft of an engine. The invention comprises a torque sensor arranged on said outer input shaft and connected to a transmission control unit; said arrangement being arranged for providing, by means of said torque sensor, a measured torque value during operation of said outer input shaft and for providing at estimated torque value during operation of said inner input shaft.

By means of an aspect of the invention, a method for achieving an accurate estimate of the inner input shaft torque is obtained, using a torque sensor that only measures the torque on the outer input shaft and using an estimated torque value during operation of the inner input shaft.

In this manner, a number of functions relating to control of the transmission and diagnosis of the engine can be implementable on a dual input shaft transmission, using only one torque sensor.

According to an embodiment, the invention is arranged so that the transmission control unit is arranged for calculating the estimated torque value by means of an observer function which is activated during said operation of the outer input shaft. The observer function is for example in the form of a Kalman filter, but the invention is not limited to such a function only.

Also, according to an embodiment, the torque sensor is also connected to an engine control unit. Suitably, the engine control unit is arranged for providing a diagnosis of the operating of said engine.

The invention also relates to a method for estimating the input torque of a dual-clutch transmission for a vehicle, wherein said transmission comprises an inner input shaft and an outer input shaft being arranged concentrically with respect to said inner input shaft, and wherein said shafts are connected to an output shaft of an engine via a dual-clutch assembly. According to this aspect of the invention, the method comprises: providing a torque sensor on said outer input shaft; connecting said torque sensor to a transmission control unit; providing, by means of said torque sensor, a value corresponding to a measured torque value when transmitting engine output torque only through said outer input shaft; and providing a value corresponding to an estimated torque value when transmitting engine output torque only through said inner input shaft.

BRIEF DESCRIPTION OF DRAWINGS

The invention will now be described below with reference to an embodiment and the appended drawings, in which:

The FIGURE is a schematic overview of a vehicle transmission and engine arrangement which the invention can be used.

DETAILED DESCRIPTION

The FIGURE illustrates, in a schematic and simplified manner, an arrangement according to an embodiment of the invention. The invention is intended to be used in connection with a transmission 1 of a dual-clutch type, which is generally known and which can be used in heavy commercial vehicles.

The function of a dual-clutch transmission as such is generally known and is described in broad terms above, and for this reason it is not described in detail here.

The transmission 1 is provided with a first input shaft 2 and a second input shaft 3. According to the embodiment, and in accordance with known technology, the input, shafts 2, 3 are concentrically arranged so that the first input shaft 2 constitutes an inner input shaft and so that the second input shaft 3 constitutes an outer input shaft, wherein the inner input shaft 2 is arranged inside the second input shaft 3.

Furthermore, the end parts of the shafts 2, 3 are associated with a dual clutch assembly 4 comprising a first clutch 5 being associated with the inner input shaft 2 and a second clutch 6 being associated with the outer input shaft 3.

The dual clutch assembly 4 is connected to an output shaft 7 of a vehicle engine 8, which suitably is in the form of a conventional diesel engine suitable for a heavy vehicle, but other prime movers are also possible, for example electric prime movers. In a conventional manner, the engine 8 is arranged for transferring power to the transmission 1 via the clutch assembly 5, the inner input shaft 2 and the outer input shaft 3.

In order to control the operation of the transmission, for example so as to obtain correct shifting between the gears, a transmission control unit 9 is arranged in connection with the transmission 1. In order to deliver a high level of performance, fuel economy and timing of shifting, the transmission control unit 9 is being fed with a number of input signals which are associated with the transmission 1. The transmission control unit 9 also generates output signals in order to control the transmission 1 according to the vehicle drivers requests while optimizing the shifting operation in view of fuel consumption, efficiency and performance of the transmission 1. The transmission of such input signals and output signals is indicated in a schematic manner by means of reference numeral 10 in the FIGURE which indicates a first communication line.

Examples of such input signals from the transmission 1 to the transmission control unit. 9 are the following: vehicle speed (which is used to determine when a gear change should take place), wheel speed, rotational speeds and actuator positions in the transmission, demanded driving torque, transmission fluid temperature, brake light switch and vehicle traction control system. Such signals, and sensors, are known as such and for this reason they are not described in detail here.

Furthermore, examples of output signals from the transmission control unit 9 are the following: signals in order to shift solenoids (which are activated to change gears at a given moment in time), pressure control solenoids and other electronic controllers. The transmission control unit 9 may also be arranged to control a shiftlock solenoid, which is adapted to stop a certain driving range from being selected if the brake pedal is not depressed, and hydraulic pressure control solenoids.

In a similar manner, the vehicles engine 8 is connected to an engine control unit 11 as indicated by reference numeral 12 in the FIGURE, which indicates a second communication line. More precisely, the engine control unit 11 is arranged for receiving input signals from sensors (not shown in the FIGURE) such as an accelerator pedal position sensor, a coolant temperature sensor, an air/fuel ratio meter; a crankshaft position sensor and other types of sensors being associated with the engine 6. Furthermore, the engine control unit 11 is arranged for controlling a number of actuators in order to control parameters such as the air/fuel ratio, ignition timing, valve timing and other functions in the engine 8. With reference to the FIGURE the signals between the engine control unit 11 and the engine 8 constitute the second communication line 12.

Furthermore, according to the embodiment, there is a third communication line 13 between the transmission control unit 9 and the engine control unit 11. For example, it is suitable for the transmission control unit 9 to transmit an output signal to the engine control unit 11 regarding control of the ignition timing or fuel quantity to the engine cylinders.

Also, the transmission control unit 9 may use signals from sensors on the engine 8 in order to determine when and how to shift.

The invention is based on the principle that a torque sensor 14 is provided in order to supply a measured torque value Tm, i.e. a value corresponding to the torque acting upon the outer input shaft 3. More precisely, according to the embodiment, the torque sensor 14 is associated with the outer input shaft 3 and the signal representing the measured torque value Tm is transmitted to the transmission control unit 9. The operation of the torque sensor 14 can for example be based on the magnetoelastic property of ferromagnetic materials, i.e. the interaction between the magnetization and the strain imposed on a magnetic material. This is previously well-known.

Accordingly, the actual torque acting upon the outer input shaft 3 gives rise to changes in the magnetic flux, which in turn can be used for generating an output signal which is proportional to the actual torque. This output signal is transferred to the transmission control unit 9, as indicated in the FIGURE.

Furthermore, the measurements from the torque sensor 14—reflecting the torque acting upon the outer input shaft 3—can also be used as a basis also for estimating the torque acting upon the inner input shaft 2. As mentioned initially, it is known that there are difficulties involved in mounting a physical torque sensor on an inner input shaft of a transmission, and for this reason, the invention is based on the principle that a torque sensor 14 is mounted on the outer input shaft 3 and is also used for estimating the torque acting upon the inner input shaft 2. This will be described in greater detail below.

As mentioned, the torque sensor 14 measures the torque Tm acting upon the outer input shaft 3. Also, the transmission unit 1, being of dual-clutch type, is arranged so that it will be operated for shifting of the gears in a manner so that torque from the engine 8 is applied to one of the two clutches while the torque is disconnected from the other clutch (on which no torque is applied). Consequently, gear shifting can be carried out generally without interrupting the transfer of torque to the wheels of the vehicle. This also means that the inner input shaft 2 will be operated during certain time periods and the outer input shaft 3 will be operated at other time periods.

It can be expected that the torque from the engine 8 will be applied to the outer input shaft 3 approximately 50% of the time that the vehicle is operated. This is due to the fact that it can be expected that those gears in the transmission 1 which are associated with the outer input shaft 3 are selected approximately 50% of the time that the vehicle is operated.

An important feature of the invention is that there is provided the measured torque value Tm during operation of the outer input shaft 3 and an estimated torque value Te during operation of the inner input shaft 2. The measured torque value Tm is transmitted to the transmission control unit. 9 in the form of an instantaneously measured value Tm from the torque sensor 14, whereas the estimated value Te is calculated using certain principles, as will be described in the following.

According to an embodiment, the transmission control 8 is arranged for calculating said estimated torque value Te by means of a calibration process in a so-called observer function. An observer function is a system which gives an estimated value of the torque acting upon the inner input shaft 2, i.e. where no torque sensor is mounted. This estimate is provided based on the measured torque Tm on the outer input shaft 3.

A previously known observer function is the Kalman filter, which is an algorithm which can be used for producing estimates of an unknown variable in a recursive way. More precisely, the Kalman filter is arranged for calculating estimated values of true measurements in a recursive manner over time through the use of incoming measurements and a mathematical process model.

In other words, the Kalman filter produces an estimate of a variable in the form of the torque, which is based on a measurement of this variable (which in turn consists of or comprises a measured torque value mixed with noise and unknown factors) which is updated in a manner using a weighted average so that a statistically treated output signal is provided.

In the present invention, an observer function such as the Kalman filter can be used with a real-time input signal in the for of the actual measurement of the torque Tm, as explained above. The input signal is available approximately 50% of the time that the vehicle is operated. The estimated torque Te is used as a measure of the torque acting upon the input shaft 2 during the time periods in which the inner input shaft 2 is active. Even though there is no real-time measurement of the actual torque acting upon the inner input shaft. 2, the estimated torque Te according to the invention is still sufficiently accurate in order to be used by the transmission 1 for controlling shifting and other functions, i.e. even when the outer input shaft 3 is de-clutched.

In summary, the transmission control unit 9 is suitably arranged for calculating the estimated torque value Te by means of an observer function which is activated during the operation of the outer input shaft 3, i.e. when engine output torque is transmitted only through the outer input shaft 3.

Generally, the invention is not limited to using an observer function of the Kalman filter type. In fact, the invention can be implemented using different types of observer or estimator functions in order to use the measured torque value Tm (representing the torque acting upon the outer input shaft 3) to determine a sufficiently accurate estimated torque value Te (representing the torque acting upon the inner input shaft 2). In other words, the invention can be implemented in different ways by allowing the estimated torque value Te to be calibrated in some suitable manner in a control unit during time periods when only the outer input shaft 3 is operated.

According to an embodiment, the estimated torque value Te is determined in a control unit such as the transmission control unit and is calibrated with reference to the measured torque value Tm when the latter is available, i.e. when the outer input shaft 3 is operating.

In summary, the control unit 9 comprises a calculation model which provides the estimated torque value Te. Also, the torque sensor 14 is provided on the outer input shaft 3, which means that there is both an estimated torque value Te and a measured torque value Tm available when the outer input shaft 3 is in operation. During those occasions where the measured torque value Tm is available, it can be compared with the estimated value Te. During such occasions, the calculation model can be calibrated so that the estimated torque value Te comes close to the measured torque values Tm. This calibration process can be provided by means of an observer, for example a Kalman filter. Also, during those occasions where the measured torque value Tm is not available (i.e. when the inner input shaft 2 is in operation), the estimated torque value Te is used. This process gives a highly accurate estimated torque value Te. Consequently, during operation of the vehicle, the two following operating modes will be used:

a) (outer input shaft 3 is used—i.e. a calibration mode):

i) functions which require a highly accurate torque measurement are activated (for example certain diagnosis functions);

ii) the calculation model for estimating the torque is calibrated; and iii) measured torque value is communicated to various control functions;

b) (inner input shaft 2 is used—i.e. a calculation mode):

i) functions which require a highly accurate torque value are deactivated;

ii) the torque is estimated by means of the calculation model;

iii) the estimated torque value is communicated to certain functions.

As an alternative to the description above, the torque sensor 14 can also be connected to the engine control unit 11. According to a further embodiment, the torque sensor 14 can be connected to both the engine control unit 11 and the transmission control unit 9. The common feature of all these embodiments is that the torque values are transferred to the engine control unit 8.

By means of the invention, certain advantages are obtained. Measuring the actual torque—and using that measured value as a base for an estimated torque value—gives a more accurate torque value, at a much higher resolution with respect to both time and torque, which enables a number of functions: feedback control of transmitted torque in the clutch; clutch diagnosis; engine diagnosis; and improved robustness of transmission control (gear shifting, gear selection etc.).

A particular feature of the invention relates to the fact that the engine control unit 11 is arranged for producing a diagnosis of the operation of the engine 8. This is based on the fact that there is a requirement for an engine diagnosis functionality which is based on measurements relating to the torque acting upon the transmission 1. For example, during engine diagnosis, it is important to detect trends in engine behaviour which occur over long periods of time. Examples of such engine measurements are for example the performance of individual cylinders over time, detection of misfires in individual cylinders, optimization of fuel consumption and other parameters.

The invention provides certain advantages. Firstly, it can be noted that the invention is less complex than a solution based on two separate torque sensors. The invention can also be implemented at a lower cost than using two sensors. Also, the wide range of engine and transmission control and diagnosis functions that are enabled by input-shaft torque measurement can be implementable on dual input-shaft transmissions.

The invention is based on the principle that there is provided a measured torque value Tm during operation of said outer input shaft 3 and an estimated torque value Te during operation of said inner input shaft 2, wherein the model for the estimated value Te is calibrated when the measured torque value Tm is available. The invention can be implemented by means of a computer program comprising program code means for performing a number of steps required for carrying out the method defined above. The invention can also be in the form of a computer program product comprising program code means stored on a computer readable medium for performing such steps when the program product is run on a computer. The invention is also constituted by a computer system for implementing the method for estimating the input torque of a dual-clutch transmission as discussed above.

The invention is not limited to the embodiments described above, but can be varied within the scope of the subsequent claims.

The invention claimed is:

1. An arrangement for estimating input torque of a dual-clutch transmission for a vehicle, the arrangement comprising the transmission, the transmission comprising an inner input shaft and an outer input shaft arranged concentrically with respect to the inner input shaft, a dual-clutch assembly for connecting the inner input shaft and the outer input shaft to an output shaft of an engine, a torque sensor arranged on the outer input shaft and connected to a transmission control unit the torque sensor being arranged to provide a measured torque value (Tm) during operation of the outer input shaft, and a transmission control unit arranged to providing an estimated torque value (Te) for the inner input shaft during operation of the inner input shaft, the transmission control unit being arranged to calibrate against the measured torque value (Tm) during operation of the outer input shaft.

2. An arrangement according to claim 1, wherein the transmission control unit is arranged for calculating the estimated torque value (Te) by an observer function being activated during operation of the outer input shaft.

3. An arrangement according to claim 2, wherein the observer function is constituted by a Kalman filter.

4. An arrangement according to claim 1, wherein the transmission control unit is arranged for controlling operation of the transmission.

5. An arrangement according to claim 1, wherein the torque sensor is connected to an engine control unit.

6. An arrangement according to claim 5, wherein the engine control unit is arranged for providing a diagnosis operation of the engine.

7. A vehicle comprising an arrangement according to claim 1.

8. A method for estimating the input torque of a dual-clutch transmission for a vehicle, wherein the transmission comprises an inner input shaft and an outer input shaft, the outer input shaft being arranged concentrically with respect to the inner input shaft, and wherein the shafts are connected to an output shaft of an engine via a dual-clutch assembly, and where a torque sensor is provided on the outer input shaft; the method comprising:

connecting the torque sensor to a transmission control unit;

providing, the torque sensor, a value corresponding to a measured torque value (Tm) when transmitting engine output torque only through the outer input shaft; and providing a value corresponding to an estimated torque value (Te) for the inner input shaft when transmitting engine output torque only through the inner input shaft, the estimated torque value (Te) for the inner input shaft being determined in the transmission control unit and being calibrated against the measured torque value (Tm) during operation of the outer input shaft.

9. A method according to claim 8, comprising calculating the estimated torque value (Te) by an observer function being activated.

10. A method according to claim 9, wherein the step of calculating the estimated torque value (Te) is carried out by a Kalman filter.

11. A method according to claim 8, comprising controlling operation of the transmission by the transmission control unit.

12. A method according to claim 8, comprising providing a diagnosis of operation of the engine when transmitting engine output torque only through the outer input shaft.

13. A computer comprising a computer program for performing all the steps of claim 8.

14. A computer program product comprising program code stored on a non-transitory computer readable medium for performing all the steps of claim 8 when the program product is run on a computer.

15. A computer system for implementing a method for estimating the input torque of a dual-clutch transmission for a vehicle, wherein the transmission comprises an inner input shaft and an outer input shaft being arranged concentrically with respect to the inner input shaft, wherein the shafts are connected to an output shaft of an engine via a dual-clutch assembly and wherein a torque sensor is provided on the outer input shaft, the computer system comprising the torque sensor, a transmission control unit, and a processor operable to establish a connection from the torque sensor to the transmission control unit, wherein the torque sensor provides a value corresponding to a measured torque value (Tm) during operation of the outer input shaft, and wherein a value corresponding to an estimated torque value (Te) for the inner input shaft is provided during operation of the inner input shaft, the estimated torque value (Te) for the inner input shaft being determined in the transmission control unit and the transmission control unit being arranged to calibrate against the measured torque value (Tm) during operation of the outer input shaft.

* * * * *